United States Patent
Kim et al.

(10) Patent No.: US 8,315,665 B2
(45) Date of Patent: Nov. 20, 2012

(54) APPARATUS AND METHOD FOR OPERATING MULTIPLE OPERATING SYSTEMS IN MULTI-MODEM MOBILE COMMUNICATION TERMINAL

(75) Inventors: Kang-Hee Kim, Yongin-si (KR); Han-Kil Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 12/573,320

(22) Filed: Oct. 5, 2009

(65) Prior Publication Data

US 2010/0097386 A1    Apr. 22, 2010

(30) Foreign Application Priority Data

Oct. 20, 2008    (KR) ........................ 10-2008-0102468

(51) Int. Cl.
*H04M 1/00* (2006.01)
(52) U.S. Cl. .................... 455/552.1; 455/550.1
(58) Field of Classification Search .............. 455/550.1, 455/552.1, 553.1; 375/222
See application file for complete search history.

(56) References Cited

U.S. PATENT DOCUMENTS

| | | |
|---|---|---|
| 2004/0156330 A1 | 8/2004 | Yi et al. |
| 2005/0268336 A1 | 12/2005 | Finnegan |
| 2006/0233136 A1 | 10/2006 | Noh et al. |
| 2008/0101446 A1* | 5/2008 | Gautier et al. ............... 375/222 |
| 2008/0161042 A1 | 7/2008 | Lee et al. |

FOREIGN PATENT DOCUMENTS

| | | |
|---|---|---|
| WO | 03/100647 A1 | 12/2003 |
| WO | 2008/073050 A3 | 6/2008 |

OTHER PUBLICATIONS

Chan-Wah Ng et al., Multiple Access Interfaces for Mobile Nodes and Networks, 12th IEEE International Conference on Singapore, Nov. 16-19, 2004, vol. 2, pp. 774-779.

* cited by examiner

*Primary Examiner* — Raymond Dean
(74) *Attorney, Agent, or Firm* — Jefferson IP Law, LLP

(57) ABSTRACT

An apparatus and method for operating multiple Operating Systems (OSs) in a multi-modem mobile communication terminal are provided. The apparatus includes a plurality of modems and a multiplexer/demultiplexer (MUX/DEMUX) module. The modems support an access to different wireless networks. The MUX/DEMUX module receives data of the corresponding wireless network from the modems, searches for OSs corresponding respectively to the modems with reference to a modem-OS mapping table, and provides data of the corresponding modems to the searched OSs.

16 Claims, 4 Drawing Sheets

APPARATUS AND METHOD FOR OPERATING MULTIPLE OPERATING SYSTEMS IN MULTI-MODEM MOBILE COMMUNICATION TERMINAL

PRIORITY

This application claims the benefit under 35 U.S.C. §119 (a) of a Korean patent application filed in the Korean Intellectual Property Office on Oct. 20, 2008 and assigned Serial No. 10-2008-0102468, the entire disclosure of which is hereby incorporated by reference.

BACKGROUND OF THE INVENTION

1. Field of the Invention

The present invention relates to an apparatus and method for operating multiple Operating Systems (OSs) in a multi-modem mobile communication terminal More particularly, the present invention relates to an apparatus and method for operating multiple OSs in a multi-modem mobile communication terminal through OS virtualization technology.

2. Description of the Related Art

A dual-standby mobile phone includes two modem chips that are used to access two different wireless networks. Herein, examples of the different wireless networks include a Code Division Multiple Access (CDMA) network, a Global System for Mobile communications (GSM) network, and a Universal Mobile Telecommunications System (UMTS) network.

For implementation of the dual-standby mobile phone, a processing unit is used in addition to the modem chips. In the processing unit, an application program, a user interface, and a related telephony module are provided as a software stack that may service incoming/outgoing calls from/to different wireless networks one by one.

The dual-standby mobile phone operates a single Operating System (OS) on one processing unit, and executes a single application program on the single OS to service different wireless networks through one user interface. For example, one call application program is executed on a single OS to service both a CDMA call and a GSM call.

The above technology may provide a single user interface to a user regardless of a type of a wireless network. However, it is difficult to integrate different specific user interfaces for different network providers into a single interface.

SUMMARY OF THE INVENTION

An aspect of the present invention is to address at least the above-mentioned problems and/or disadvantages and to provide at least the advantages described below. Accordingly, an aspect of the present invention is to provide an apparatus and method for operating multiple Operating Systems (OSs) in a multi-modem mobile communication terminal.

Another aspect of the present invention is to provide an apparatus and method for applying an OS virtualization technology in a multi-modem mobile communication terminal, thereby enabling multiple OSs to implement software stacks of different network providers according to the requirements of the network providers and enabling an OS virtualization layer to execute the corresponding OSs for call connection requests received from different modem chips.

Another aspect of the present invention is to provide an apparatus and method for allowing an OS virtualization layer of a mobile communication terminal to receive data of a corresponding wireless network from a plurality of modems, search for an OS corresponding to the modem with reference to a modem-OS mapping table, and provide data of the modem to the searched OS.

Another aspect of the present invention is to provide an apparatus and method for allowing an OS virtualization layer of a mobile communication terminal to receive data of a corresponding wireless network from a plurality of OSs, search for a modem corresponding to the OS with reference to a modem-OS mapping table, and provide data of the OS to the searched modem.

Another aspect of the present invention is to provide an apparatus and method for allowing an OS virtualization layer of a mobile communication terminal to monitor a frame buffer for each OS, which buffers an image generated as a result of OS execution, select a preset number of frame buffers with recently-updated data, extract images stored in the selected frame buffers, and display the extracted images on a plurality of virtually-divided screens.

In accordance with an aspect of the present invention, an apparatus for operating multiple OSs in a multi-modem mobile communication terminal is provided. The apparatus includes a plurality of modems for supporting an access to a plurality of different wireless networks, and a multiplexer/demultiplexer (MUX/DEMUX) module for receiving data of a corresponding wireless network from one of the plurality of the modems, for searching for OSs corresponding respectively to the plurality of the modems with reference to a modem-OS mapping table, and for providing data of the corresponding modems to the searched OSs.

In accordance with another aspect of the present invention, a method for operating multiple OSs in a multi-modem mobile communication terminal is provided. The method includes receiving data of a corresponding wireless network from a plurality of modems, searching for OSs corresponding respectively to the modems with reference to a modem-OS mapping table, and providing data of the corresponding modems to the searched OSs.

In accordance with yet another aspect of the present invention, a method for operating multiple OSs in a multi-modem mobile communication terminal is provided. The method includes receiving data of a corresponding wireless network from a plurality of Oss, searching for modems corresponding respectively to the OSs with reference to a modem-OS mapping table, and providing data of the corresponding OSs to the searched modems.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a scheme for operating multiple Operating Systems (OSs) in a multi-modem mobile communication terminal through OS virtualization technology.

Examples of the multi-modem mobile communication terminal include multi-standby mobile phones. The multi-standby mobile phone is an extension of a dual-standby mobile phone. The multi-standby mobile phone is equipped with a plurality of different modem chips that are used to access different wireless networks. Examples of the different wireless networks include a CDMA network, a GSM network, and a UMTS network. The OS virtualization technology is used to execute a plurality of OSs on one processing unit.

Figure 1:
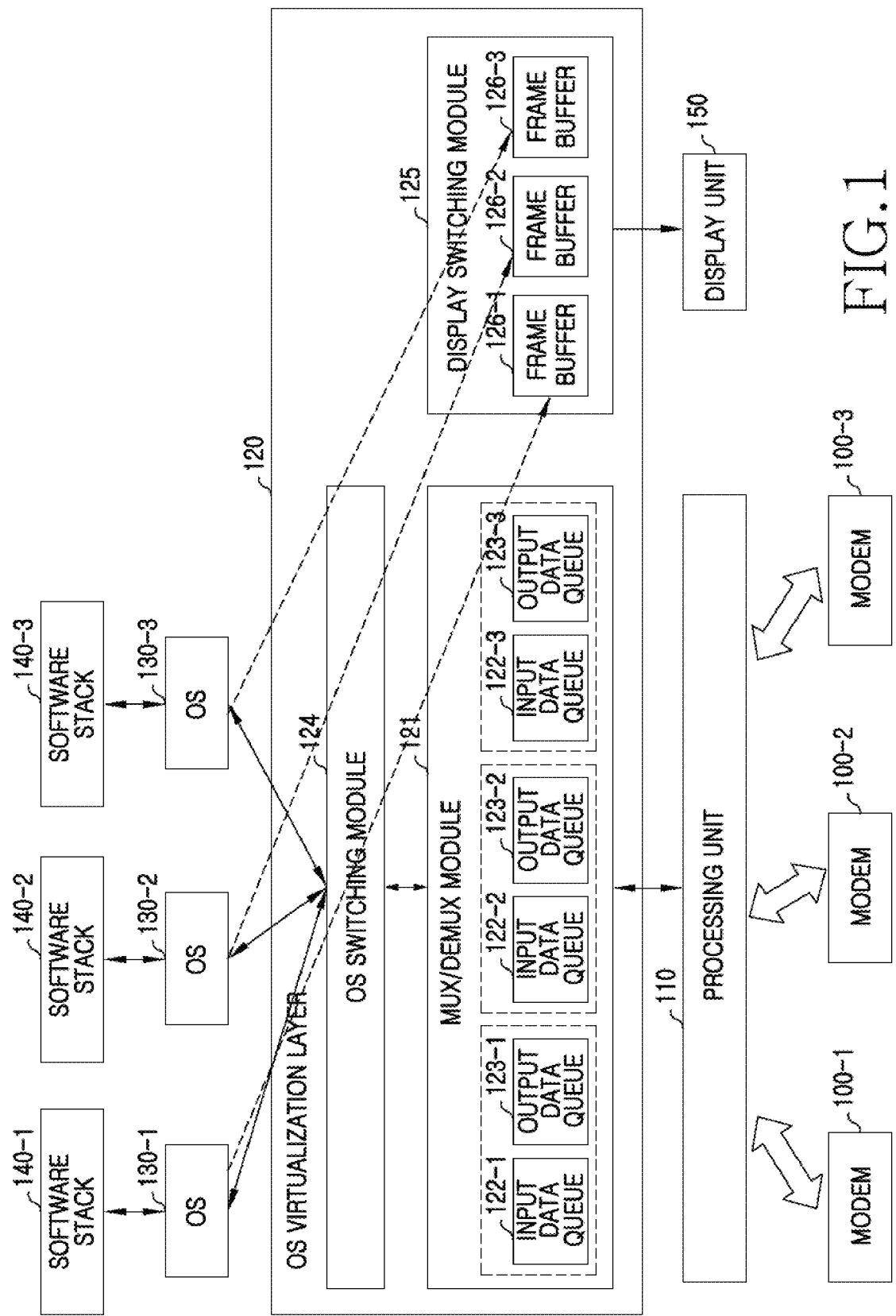
FIG. 1 is a block diagram of an apparatus for operating multiple Operating Systems (OSs) in a multi-modem mobile communication terminal through OS virtualization technology according to an exemplary embodiment of the present invention.

FIG. 1 is a block diagram of an apparatus for operating multiple OSs in a multi-modem mobile communication terminal through OS virtualization technology according to an exemplary embodiment of the present invention. The following description is made on the assumption that the mobile communication terminal has three modems.

Referring to FIG. 1, the mobile communication terminal includes a plurality of modems 100-1, 100-2 and 100-3; a processing unit 110; an OS virtualization layer 120; a plurality of OSs 130-1, 130-2 and 130-3 corresponding respectively to the modems 100-1, 100-2 and 100-3; a plurality of software stacks 140-1, 140-2 and 140-3 allocated respectively to the modems 100-1, 100-2 and 100-3; and a display unit 150 capable of being virtually divided into a plurality of screens. The OS virtualization layer 120, the OSs 130-1, 130-2 and 130-3, and the software stacks 140-1, 140-2 and 140-3 are software blocks on the processing unit 110. The OS virtualization layer 120 includes a multiplexer/demultiplexer (MUX/DEMUX) module 121, an OS switching module 124, and a display switching module 125. The MUX/DEMUX module 121 includes input data queues 122-1, 122-2 and 122-3 and output data queues 123-1, 123-2 and 123-3 for the respective OSs. The display switching module 125 includes frame buffers 126-1, 126-2 and 126-3 for the respective OSs.

The modems 100-1, 100-2 and 100-3 support an access to different wireless networks. That is, each of the modems 100-1, 100-2 and 100-3 provides packet data and signaling data, received from the corresponding wireless networks, to the processing unit 110; and transmits packet data and signaling data, provided from the processing unit 110, to the corresponding wireless networks. Herein, the modems 100-1, 100-2 and 100-3 and the processing unit 110 communicate through a hardware communication channel. Examples of the hardware communication channel include serial communications, parallel communications, dual-port memories, and the like.

The processing unit 110 manages the modems 100-1, 100-2 and 100-3, and controls the execution of the OSs 130-1, 130-2 and 130-3 in the OS virtualization layer 120. Also, the processing unit 110 provides data from the modems 100-1, 100-2 and 100-3 to the MUX/DEMUX module 121 of the OS virtualization layer 120 and provides data from the MUX/DEMUX module 121 of the OS virtualization layer 120 to the modems 100-1, 100-2 and 100-3. Herein, one of the modems 100-1, 100-2 and 100-3 may also serve as the processing unit 110.

The OS virtualization layer 120 includes the MUX/DEMUX module 121, the OS switching module 124 and the display switching module 125 to execute the OSs 130-1, 130-2 and 130-3. The MUX/DEMUX module 121 stores packet data and signaling data, received from the modems 100-1, 100-2 and 100-3 through the processing unit 110, in the input data queues 122-1, 122-2 and 122-3 of the OSs 130-1, 130-2 and 130-3 corresponding respectively to the modems 100-1, 100-2 and 100-3, and provides the same to the OSs 130-1, 130-2 and 130-3 (Demultiplexing). Also, the MUX/DEMUX module 121 stores packet data and signaling data, received from the OSs 130-1, 130-2 and 130-3, in the output data queues 123-1, 123-2 and 123-3 of the OSs 130-1, 130-2 and 130-3, and provides the same to the modems 100-1, 100-2 and 100-3 corresponding respectively to the OSs 130-1, 130-2 and 130-3 through the processing unit 110 (Multiplexing). To this end, a modem-OS mapping table is provided in the MUX/DEMUX module 121. An OS corresponding to a single modem, or a modem corresponding to a single OS may be searched with reference to the modem-OS mapping table.

Only a single OS may be executed on the processing unit 110 at a time. Thus, when one of the modems 100-1, 100-2 and 100-3 transmits data to the processing unit 110 and thus an interrupt occurs in the processing unit 110, the OS that is being executed on the processing unit 110 may be different from the OS that is to receive the data. In this case, the MUX/DEMUX module 121 stores data, received from the corresponding modems 100-1, 100-2 and 100-3, in the input data queues 122-1, 122-2 and 122-3 of the corresponding OSs 130-1, 130-2 and 130-3, and then calls the OS switching module 124.

According to the call from the MUX/DEMUX module 121, the OS switching module 124 of the OS virtualization layer 120 switches data, stored in the input data queues 122-1, 122-2 and 122-3 for the respective OSs 130-1, 130-2 and 130-3, to the corresponding OSs 130-1, 130-2 and 130-3. Herein, in order to prevent frequent switching operations, the OS switching module 124 may perform a switching operation when the input data queues 122-1, 122-2 and 122-3 for the respective OSs 130-1, 130-2 and 130-3 are filled with a preset amount of data, or when necessary data for the respective OSs 130-1, 130-2 and 130-3 are stored. Also, the OS switching module 124 may periodically switch to different executable OSs according to a preset rule (e.g., priority or round robin), in order to prevent one of the OSs 130-1, 130-2 and 130-3 from continuing to occupy the processing unit 110 in order to process consecutively-received data.

The display switching module 125 of the OS virtualization layer 120 includes the frame buffers 126-1, 126-2 and 126-3 for the respective OSs. Each of the frame buffers 126-1, 126-2 and 126-3 buffers an image generated as a result of the execution of the corresponding OSs 130-1, 130-2 and 130-3, the data of which is updated by the corresponding OSs 130-1, 130-2 and 130-3. The image generated as a result of the execution of the OSs 130-1, 130-2 and 130-3 represents the state of the corresponding software stacks 140-1, 140-2 and 140-3 according to the execution of the corresponding OSs 130-1, 130-2 and 130-3. When detecting a newly generated or changed image in the corresponding software stacks 140-1, 140-2 and 140-3, the OSs 130-1, 130-2 and 130-3 update the same to the corresponding frame buffers 126-1, 126-2 and 126-3. The display switching module 125 monitors whether the data of the frame buffers 126-1, 126-2 and 126-3 is updated. When detecting that the data is updated, the display switching module 125 switches the image, buffered by the corresponding frame buffers 126-1, 126-2 and 126-3, to the display unit 150.

The OSs 130-1, 130-2 and 130-3 corresponding respectively to the modems 100-1, 100-2 and 100-3 have the right to exclusively access the processing unit 110 and hardware devices connected thereto. The OSs 130-1, 130-2 and 130-3 are executed by receiving data from the corresponding modems 100-1, 100-2 and 100-3 through the OS virtualization layer 120, and the received data is provided to the software stacks 140-1, 140-2 and 140-3 allocated to the corresponding modems 100-1, 100-2 and 100-3, thereby servicing the corresponding wireless networks to the users. Also, the OSs 130-1, 130-2 and 130-3 provide data, received from the software stacks 140-1, 140-2 and 140-3 allocated to the corresponding modems 100-1, 100-2 and 100-3, through the OS virtualization layer 120 to the corresponding modems 100-1, 100-2 and 100-3. At this point, the OSs 130-1, 130-2 and 130-3 buffer images, generated as a result of the execution of the OSs 130-1, 130-2 and 130-3, in the frame buffers 126-1, 126-2 and 126-3 in the display switching module 125 of the OS virtualization layer 120.

The software stacks 140-1, 140-2 and 140-3 allocated respectively to the modems 100-1, 100-2 and 100-3 include application programs specific to the corresponding wireless networks or provider networks, user interfaces, and related telephony modules to service the corresponding wireless networks to the users. For example, in the case of the terminal equipped with both a CDMA modem chip and a GSM modem chip, the software stacks include an application program specific to a CDMA network (or a CDMA provider network), a user interface, a related telephony module, an application program specific to a GSM network (or a GSM provider network), a user interface, and a related telephony module to service the CDMA network and the GSM network to the users.

The display unit 150 displays an image, provided from the display switching module 125 of the OS virtualization layer 120, on a Liquid Crystal Display (LCD) screen. At this point, images from one or more frame buffers 126-1, 126-2 and 126-3 may be displayed on the LCD screen at a time. For example, the LCD screen may be virtually divided into a plurality of screens to display the images from the frame buffers 126-1, 126-2 and 126-3. Herein, the number of the virtual screens is less than or equal to (e.g., 2) the number of the OSs 130-1, 130-2 and 130-3 (e.g., 3). In this way, if the LCD screen is virtually divided into a plurality of screens, the display switching module 125 of the OS virtualization layer 120 may simultaneously output the images of the frame buffers 126-1, 126-2 and 126-3 to the display unit 150. That is, images about M (less than or equal to the number of the OSs) number of the OSs 130-1, 130-2 and 130-3, which are recently updated, may be simultaneously displayed on M number of the virtual screens. Accordingly, through M number of the virtual screens, the users may observe the state change of the software stacks 140-1, 140-2 and 140-3 allocated respectively to the modems 100-1, 100-2 and 100-3.

Figure 2:
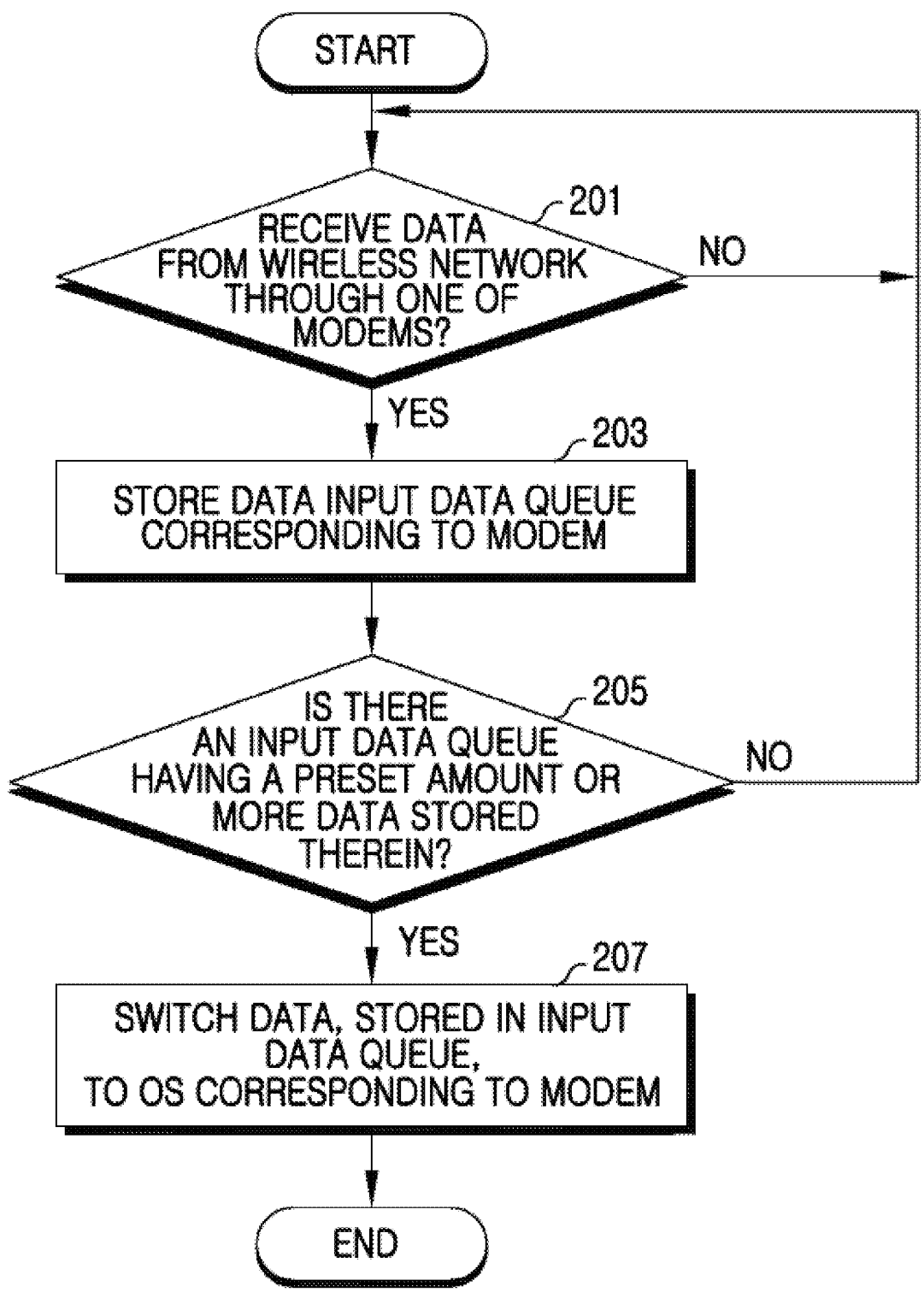
FIG. 2 is a flowchart illustrating a process for transmitting data from multiple modems to multiple OSs in a multi-modem mobile communication terminal through OS virtualization technology according to an exemplary embodiment of the present invention.

FIG. 2 is a flowchart illustrating a process for transmitting data from multiple modems to multiple OSs in a multi-modem mobile communication terminal through OS virtualization technology according to an exemplary embodiment of the present invention.

Referring to FIG. 2, in step 201, the mobile communication terminal determines whether data is received from the corresponding wireless network through one of the modems. If it is determined that data is not received from the corresponding wireless network through one of the modems, the mobile communication terminal repeats step 201. On the other hand, if it is determined that data is received from the corresponding wireless network through one of the modems, the mobile communication terminal proceeds to step 203. In step 203, the mobile communication terminal stores the received data in an input data queue corresponding to the modem.

In step 205, the mobile communication terminal determines if there is an input data queue having a preset amount or more data stored therein. If it is determined that there is no input data queue having a preset amount or more data stored therein, the mobile communication terminal returns to step 201. On the other hand, if it is determined that there is an input data queue having a preset amount or more data stored therein, the mobile communication terminal proceeds to step 207. In step 207, the mobile communication terminal switches data, stored in the input data queue, to an OS corresponding to the modem, thereby executing the OS. At this point, the mobile communication terminal may search for the OS corresponding to the modem with reference to the modem-OS mapping table.

Herein, the switching operation may be performed when necessary data for the respective OSs are stored, as well as when there is an input data queue having a preset amount or more data stored therein. Also, different executable OSs may be periodically switched according to a preset rule (e.g., priority or round robin).

Thereafter, the mobile communication terminal ends the process.

Figure 3:
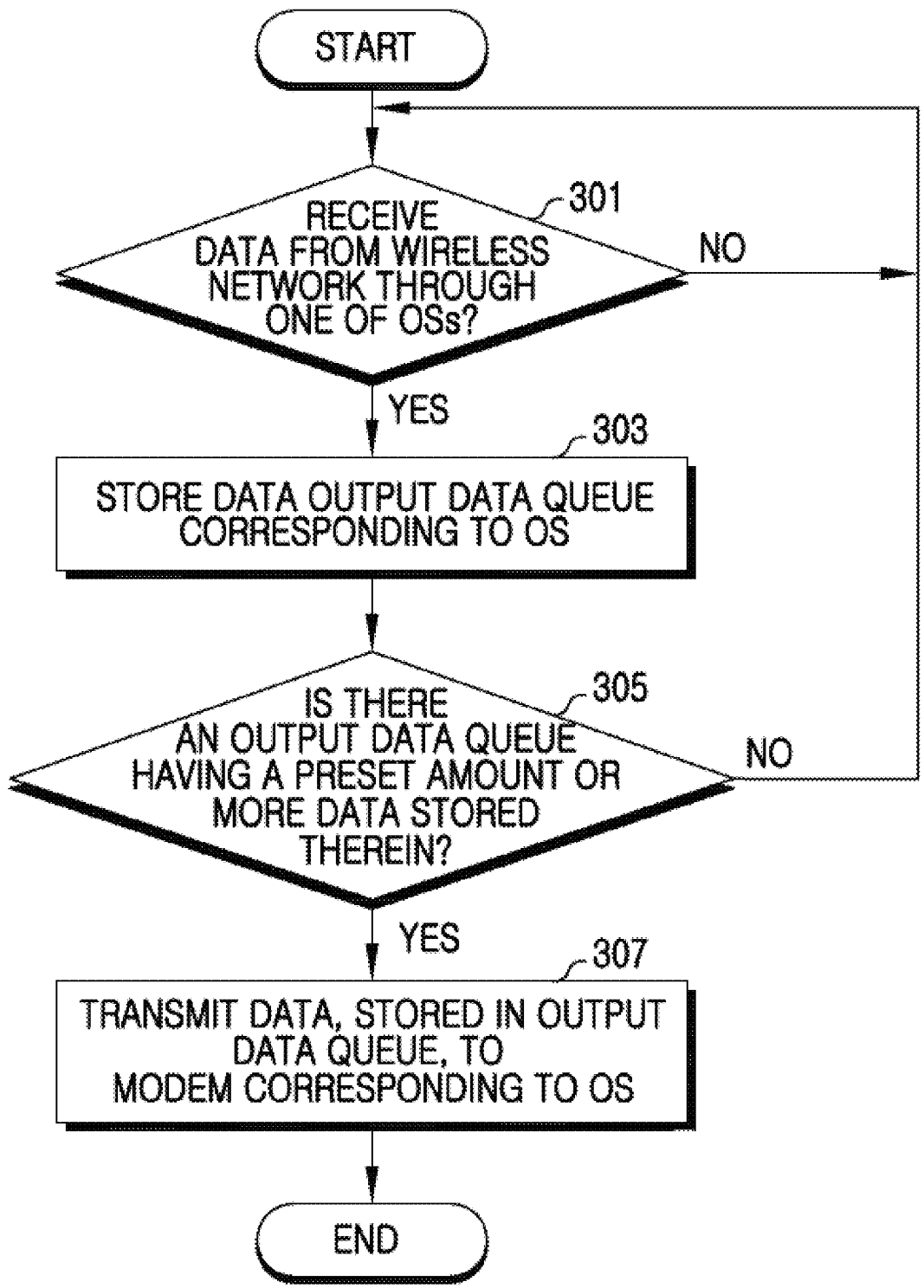
FIG. 3 is a flowchart illustrating a process for transmitting data from multiple OSs to multiple modems in a multi-modem mobile communication terminal through OS virtualization technology according to an exemplary embodiment of the present invention.

FIG. 3 is a flowchart illustrating a process for transmitting data from multiple OSs to multiple modems in a multi-modem mobile communication terminal through OS virtualization technology according to an exemplary embodiment of the present invention.

Referring to FIG. 3, in step 301, the mobile communication terminal determines whether data is received from the corresponding wireless network through one of the OSs. If it is determined that data is not received from the corresponding wireless network through one of the OSs, the mobile communication terminal repeats step 301. On the other hand, if it is determined that data is received from the corresponding wireless network through one of the OSs, the mobile communication terminal proceeds to step 303. In step 303, the mobile communication terminal stores the received data in an output data queue corresponding to the OS.

In step 305, the mobile communication terminal determines if there is an output data queue having a preset amount or more data stored therein. If it is determined that there is no output data queue having a preset amount or more data stored therein, the mobile communication terminal returns to step 301. On the other hand, if it is determined that there is an output data queue having a preset amount or more data stored therein, the mobile communication terminal proceeds to step 307. In step 307, the mobile communication terminal transmits data, stored in the output data queue, to a modem corresponding to the OS (i.e., supporting the corresponding wireless network). At this point, the mobile communication terminal may search for the modem corresponding to the OS with reference to the modem-OS mapping table.

Thereafter, the mobile communication terminal ends the process.

Figure 4:
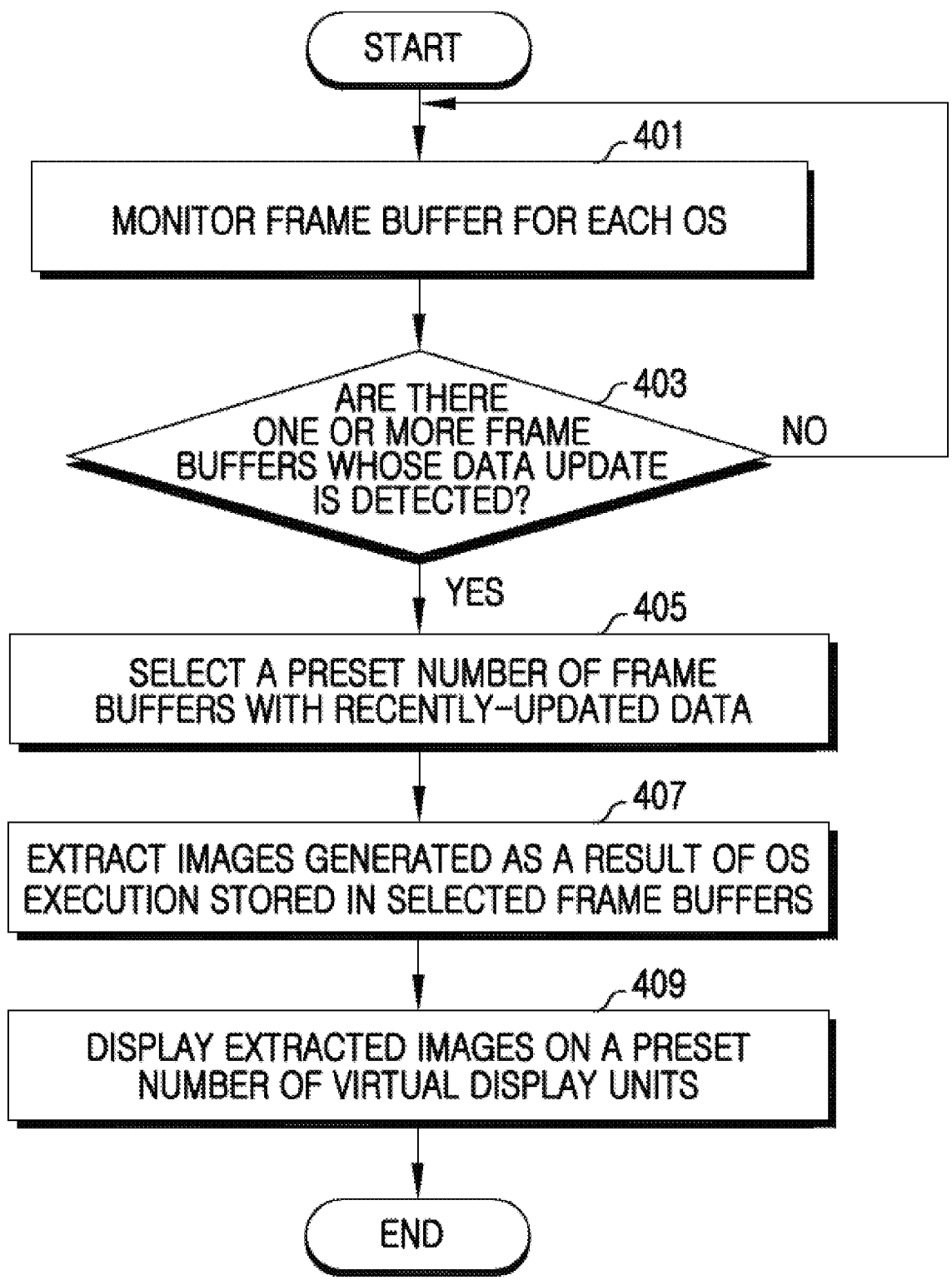
FIG. 4 a flowchart illustrating a process for displaying an image generated as a result of OS execution in a multi-modem mobile communication terminal according to an exemplary embodiment of the present invention.

FIG. 4 a flowchart illustrating a process for displaying an image generated as a result of the OS execution in a multi-modem mobile communication terminal according to an exemplary embodiment of the present invention.

Referring to FIG. 4, in step 401, the mobile communication terminal monitors the frame buffers for the respective OSs. In step 403, the mobile communication terminal determines whether there are one or more frame buffers whose data update is detected. If it is determined that there is no frame buffer whose data update is detected, the mobile communication terminal returns to step 401.

In contrast, if it is determined that there are one or more frame buffers whose data update is detected, the mobile communication terminal proceeds to step 405. In step 405, the mobile communication terminal selects a preset number of recently-updated frame buffers among the frame buffers whose data update is detected. In step 407, the mobile communication terminal extracts images generated as a result of the OS execution, stored in the corresponding frame buffers, from the selected frame buffers.

In step 409, the mobile communication terminal displays the extracted images on a preset number of virtual display units. In an exemplary embodiment of the present invention, an LCD screen may be virtually divided into a plurality of virtual screens to display the images from the frame buffers. Herein, the number of the virtual screens is less than or equal to (e.g., 2) the number of the OSs (e.g., 3).

In this way, if the LCD screen is divided into a plurality of virtual screens, application programs executed by the OSs may be simultaneously displayed on the screen. For example, in the case of a dual-standby mobile phone, an LCD screen is divided into two virtual screens, so that the operation state of CDMA application programs may be displayed on one of the two virtual screens and the operation state of UMTS application programs may be displayed on the other virtual screen. If the number of the OSs is greater than the number of the virtual screens, the OSs with execution contexts more important to the user may be mapped and displayed on a limited number of the virtual screens according to a preset rule.

As an exemplary method, the application programs executed by the OSs may be displayed on the screen according to priority, without dividing the LCD screen virtually. For example, in the case of a dual-standby mobile phone, the operation state of recently-executed CDMA application programs may be displayed on the screen, with priority to the operation state of UMTS application programs.

Thereafter, the mobile communication terminal ends the process.

As described above, exemplary embodiments of the present invention operates multiple OSs in the multi-modem mobile communication terminal through OS virtualization technology, thereby making it possible to avoid the software development complexity in the implementation of a single OS and increase the reusability of an already-developed network provider software stack. Also, because the OS virtualization technology may accommodate a plurality of OSs, a plurality of network provider software stacks may be simultaneously provided and the concept of simultaneous call, which is difficult to implement by a single OS operation, may be implemented more easily. That is, simultaneous voice call, simultaneous data call, and simultaneous voice-data call may be implemented between different software stacks. For example, the user may receive a UMTS data service in the background (i.e., communication through a UMTS modem) while enjoying a CDMA voice call service (i.e., communication through a CDMA modem). As another example, the user may receive a CDMA data service and a UMTS data service simultaneously. Also, exemplary embodiments of the present invention virtually divides the LCD screen into a plurality of virtual screens, thus making it possible to display the application programs, which are executed by the OSs, on the screen simultaneously.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for operating multiple Operating Systems (OSs) in a multi-modem mobile communication terminal, the apparatus comprising:
   a plurality of modems for supporting an access to a plurality of different wireless networks; and
   a multiplexer/demultiplexer (MUX/DEMUX) module for receiving data of a corresponding wireless network from one of the plurality of the modems, for searching for OSs corresponding respectively to the plurality of the modems with reference to a modem-OS mapping table, and for providing data of the corresponding modems to the searched OSs.

2. The apparatus of claim 1, wherein the MUX/DEMUX module stores data of the corresponding modems in input data queues corresponding respectively to the plurality of the modems.

3. The apparatus of claim 2, further comprising:
   an OS switching module for switching data, stored in the input data queue for each modem, to the corresponding OS periodically or according to an event.

4. The apparatus of claim 3, wherein the event comprises at least one of the case where there is an input data queue having a preset amount or more data stored therein, and the case where necessary data for the respective OSs are stored.

5. The apparatus of claim 1, further comprising:
a frame buffer for each OS for buffering an image generated as a result of OS execution;
a display switching module for monitoring the frame buffer for each OS, for selecting a preset number of frame buffers with recently-updated data according to the monitoring of the frame buffer, and for extracting images stored in the selected frame buffers; and
a display unit for dividing a Liquid Crystal Display (LCD) screen into virtual screens and for displaying the extracted images on the virtual screens.

6. The apparatus of claim 5, wherein the display switching module, when it monitors the frame buffer, determines whether there are one or more frame buffers having the recently-updated data.

7. The apparatus of claim 1, wherein the MUX/DEMUX module receives data of the corresponding wireless network from a plurality of OSs, searches for a modem corresponding to the OS with reference to a modem-OS mapping table, and provides data of the OS to the searched modem.

8. The apparatus of claim 7, wherein the MUX/DEMUX module stores data of the corresponding OSs in output data queues corresponding respectively to the OSs.

9. A method for operating multiple Operating Systems (OSs) in a multi-modem mobile communication terminal, the method comprising:
receiving data of a corresponding wireless network from a plurality of modems;
searching for OSs corresponding respectively to the modems with reference to a modem-OS mapping table; and
providing data of the corresponding modems to the searched OSs.

10. The method of claim 9, further comprising:
storing data of the corresponding modems in input data queues corresponding respectively to the modems.

11. The method of claim 10, wherein the providing of the data of the corresponding modems to the searched OSs comprises providing the data, stored in the input data queues, to the corresponding OSs periodically or according to an event.

12. The method of claim 11, wherein the event comprises at least one of the case where there is an input data queue having a preset amount or more data stored therein, and the case where necessary data for the respective OSs are stored.

13. The method of claim 9, further comprising:
buffering an image, generated as a result of OS execution, by means of a frame buffer for each OS;
monitoring the frame buffer for each OS;
selecting a preset number of frame buffers with recently-updated data according to the monitoring of the frame buffer;
extracting images stored in the selected frame buffers; and
dividing a Liquid Crystal Display (LCD) screen into virtual screens and displaying the extracted images on the virtual screens.

14. The method of claim 13, wherein the monitoring of the frame buffer comprises determining whether there are one or more frame buffers having the recently-updated data.

15. A method for operating multiple Operating Systems (OSs) in a multi-modem mobile communication terminal, the method comprising:
receiving data of a corresponding wireless network from a plurality of OSs;
searching for modems corresponding respectively to the OSs with reference to a modem-OS mapping table; and
providing data of the corresponding OSs to the searched modems.

16. The method of claim 15, further comprising:
storing data of the corresponding OSs in output data queues corresponding respectively to the OSs.

* * * * *